United States Patent
Von Beck et al.

(10) Patent No.: US 7,409,878 B2
(45) Date of Patent: Aug. 12, 2008

(54) TORQUESHAFT MAGNETIC FIELD MEASUREMENT SYSTEMS FOR GAS TURBINE ENGINES

(75) Inventors: Chuck H. Von Beck, Mesa, AZ (US); Hong Wan, Plymouth, MN (US); Anthony D. D'Angelo, Desert Hills, AZ (US)

(73) Assignee: Honeywell International Inc., Morristown, NJ (US)

( * ) Notice: Subject to any disclaimer, the term of this patent is extended or adjusted under 35 U.S.C. 154(b) by 126 days.

(21) Appl. No.: 11/102,493

(22) Filed: Apr. 8, 2005

(65) Prior Publication Data

US 2006/0225521 A1    Oct. 12, 2006

(51) Int. Cl.
G01L 3/10 (2006.01)
G01R 33/09 (2006.01)

(52) U.S. Cl. .............. 73/862.333; 324/207.21; 324/252

(58) Field of Classification Search ............ 73/862.331, 73/862.333, 862.335, 862.339; 324/207.21, 324/252
See application file for complete search history.

(56) References Cited

U.S. PATENT DOCUMENTS

| | | | |
|---|---|---|---|
| 4,414,855 A | 11/1983 | Iwasaki | |
| 4,416,161 A | 11/1983 | Barkhoudarian | |
| 4,463,610 A | 8/1984 | Anderson, III et al. | |
| 4,750,371 A | 6/1988 | Kobayashi et al. | |
| 4,817,444 A | 4/1989 | Yagi et al. | |
| 4,823,617 A | 4/1989 | Hase et al. | |
| 4,852,411 A | 8/1989 | Beihoff | |
| 4,893,502 A * | 1/1990 | Kubota et al. .............. 73/118.1 |
| 4,896,544 A | 1/1990 | Garshelis | |
| 4,933,580 A | 6/1990 | Ishino et al. | |
| 4,972,728 A | 11/1990 | Yoshimura et al. | |
| 4,976,160 A | 12/1990 | Dobler et al. | |
| 4,989,460 A | 2/1991 | Mizuno et al. | |
| 4,991,447 A | 2/1991 | Yahagi et al. | |
| 5,009,279 A * | 4/1991 | Matsuda .............. 180/197 |
| 5,052,232 A | 10/1991 | Garshelis | |
| 5,092,182 A | 3/1992 | Ikeda et al. | |
| 5,131,281 A | 7/1992 | Utsui et al. | |
| 5,165,286 A | 11/1992 | Hamamura et al. | |
| 5,193,267 A | 3/1993 | Satoh et al. | |

(Continued)

FOREIGN PATENT DOCUMENTS

EP    0675342    10/1995

(Continued)

OTHER PUBLICATIONS

"High Temperature Magnetic Sensors." ssec.honeywell.com. Accessed online on Sep. 18, 2006. <http://www.ssec.honeywell.com/hightemp/datasheets/HTMC1021D.pdf/>.*

(Continued)

*Primary Examiner*—Edward Lefkowitz
*Assistant Examiner*—Punam Patel
(74) *Attorney, Agent, or Firm*—Ingrassia, Fisher & Lorenz, P.C.

(57) ABSTRACT

A torqueshaft magnetic field measurement system includes a ceramic package enclosing a magnetoresistive sensor for converting a sensed magnetic field into a differential output voltage, an amplifier for converting the voltage into an amplified sensor signal, and a temperature sensor. An electrical cable connects the ceramic package to an electronic controller with a microprocessor.

16 Claims, 6 Drawing Sheets

U.S. PATENT DOCUMENTS

| | | | |
|---|---|---|---|
| 5,269,192 A | 12/1993 | Utsui et al. | |
| 5,313,845 A | 5/1994 | Hayashi et al. | |
| 5,321,985 A | 6/1994 | Kashiwagi et al. | |
| 5,323,659 A | 6/1994 | Wakamiya et al. | |
| 5,351,003 A * | 9/1994 | Bauer et al. | 324/207.12 |
| 5,351,555 A | 10/1994 | Garshelis | |
| 5,367,257 A | 11/1994 | Garshelis | |
| 5,400,656 A | 3/1995 | Schiessle et al. | |
| 5,412,582 A | 5/1995 | Hesthamar et al. | |
| 5,465,627 A | 11/1995 | Garshelis | |
| 5,520,059 A | 5/1996 | Garshelis | |
| 5,557,974 A | 9/1996 | Hase et al. | |
| 5,585,574 A | 12/1996 | Sugihara et al. | |
| 5,591,925 A | 1/1997 | Garshelis | |
| 5,675,886 A | 10/1997 | Hase et al. | |
| 5,706,572 A | 1/1998 | Garshelis | |
| 5,708,216 A | 1/1998 | Garshelis | |
| 5,741,982 A | 4/1998 | Kobayashi et al. | |
| 6,047,605 A | 4/2000 | Garshelis | |
| 6,145,387 A | 11/2000 | Garshelis | |
| 6,220,105 B1 | 4/2001 | Cripe | |
| 6,260,423 B1 | 7/2001 | Garshelis | |
| 6,326,781 B1 * | 12/2001 | Kunde et al. | 324/207.21 |
| 6,341,535 B1 | 1/2002 | Yasui | |
| 6,370,967 B1 | 4/2002 | Kouketsu et al. | |
| 6,490,934 B2 | 12/2002 | Garshelis | |
| 6,553,847 B2 | 4/2003 | Garshelis | |
| 6,557,425 B2 | 5/2003 | Kamiya et al. | |
| 6,581,480 B1 | 6/2003 | May et al. | |
| 6,698,299 B2 | 3/2004 | Cripe | |
| 6,763,733 B2 | 7/2004 | Tokumoto | |
| 6,776,057 B1 | 8/2004 | May | |
| 6,779,409 B1 | 8/2004 | Kwun et al. | |
| 2002/0020229 A1 | 2/2002 | Nakamura et al. | |
| 2002/0162403 A1 | 11/2002 | Cripe | |
| 2002/0189372 A1 | 12/2002 | Wallin et al. | |
| 2003/0013235 A1 * | 1/2003 | Featherby et al. | 438/127 |
| 2003/0057938 A1 * | 3/2003 | Goetz | 324/117 R |
| 2003/0117254 A1 | 6/2003 | Wan et al. | |
| 2003/0167857 A1 | 9/2003 | Sugimura et al. | |
| 2006/0169062 A1 * | 8/2006 | Varonis | 73/862.333 |

FOREIGN PATENT DOCUMENTS

| | | | |
|---|---|---|---|
| WO | WO 95/33982 | | 12/1995 |
| WO | WO 00/57150 | | 9/2000 |
| WO | WO0113081 | * | 2/2001 |
| WO | WO 02/068922 | | 9/2002 |

OTHER PUBLICATIONS

"High Temperature Quad Operational Amplifier." ssec.honeywell. com. Accessed online on Sep. 18, 2006. <http://www.ssec.honeywell.com/hightemp/datasheets/HT1104.pdf/>.*

"High Temperature Electronics for Sensor Interface and Data Acquisition." ssec.honeywell.com. Accessed online on Sep. 18, 2006. <www.ssec.honeywell.com/hightemp/datasheets/SenExpo98. pdf>.*

Caruso, MJ; Smith CH; "A New Perspective on Magnetic Field Sensing." Accessed online on Aug. 17, 2007. <http://web.archive.org/web/20030308034052/http://www.ssec.honeywell.com/magnetic/datasheets/new_pers.pdf>.*

Garshelis, I. J. "Torque and Power Measurement" CRC Press LLC. 2000. Accessed online on Aug. 17, 2007. < http://www.autex.spb.ru/download/wavelet/books/sensor/CH24.PDF>.*

Garshelis, IJ; Jones, CA. "Miniaturized Magnetoelastic Torque Transducers" IEEE Transactions on Magnetic, vol. 35, No. 5, Sep. 1999. Accessed online on Aug. 17, 2007 < http://ieeexplore.ieee.org/iel5/20/17367/00800619.pdf?arnumber=800619>.*

PCT International Search Report PCT/US2006/000419, Jul. 26, 2006.

* cited by examiner

TORQUESHAFT MAGNETIC FIELD MEASUREMENT SYSTEMS FOR GAS TURBINE ENGINES

GOVERNMENT RIGHTS

This invention was made with Government support under DAAH10-03-9-0001 awarded by Army AATD MET. The Government has certain rights in this invention.

BACKGROUND OF THE INVENTION

The present invention generally relates to torque sensors, and in particular to a method and device for non-contact torqueshaft magnetic field measurement under harsh environmental conditions.

Torque measurement may be required for output control or for changing supplied power in applications where power is transmitted via a rotating drive shaft. Prior art methods have included the process of applying strain gauges to the surface of the drive shaft to measure torque. More recently, research and development efforts continue to produce various non-contact methods using magnetoresistive sensors.

It is known in the present state of the art that shaft torque can be measured by emplacing magnetoelastic regions on the shaft and detecting magnetic field changes via a magnetic sensor. For example, U.S. Pat. No. 4,896,544, discloses a magnetoelastic torque transducer for providing an electrical signal indicative of torque applied to a shaft. The transducer includes a primary coil installed in a cylindrically-shaped yoke. Operation of the transducer, however, requires that a varying current be supplied to the coil to produce a varying magnetic field.

Many conventional systems utilize sensing coils to detect changes in the magnetic field. For example, U.S. Pat. No. 4,989,460 discloses a magnetorestriction-type torque sensor employing a plurality of detector coils disposed in an axial arrangement along a rotary body. Such coil configurations suffer from the shortcomings that detector coils do not generally provide consistently repeatable measurements, detector coils tend to be bulky, and alignment of such coil-type sensors is generally difficult. Moreover, the present state of the art does not disclose magnetic sensors suitable for use in harsh environments, such as elevated temperatures.

As can be seen, there is a need for a method and device for obtaining reliable torque measurements from rotating members operating in harsh environments.

SUMMARY OF THE INVENTION

In one aspect of the present invention, a torqueshaft magnetic field sensor comprises a magnetoresistive sensor functioning to convert a sensed magnetic field into a differential output voltage; an amplifier for receiving the differential output voltage and producing an amplified sensor signal; and a high-temperature housing enclosing the magnetoresistive sensor and the amplifier.

In another aspect of the present invention, a torqueshaft magnetic field measurement system comprises a torqueshaft magnetic field sensor for converting a sensed magnetic field into an amplified sensor signal; an electrical cable connected to the torqueshaft magnetic field sensor; and an electronic controller connected to the electrical cable for receiving the amplified sensor signal.

In still another aspect of the present invention, a torqueshaft magnetic field sensor comprises a first magnetoresistive wheatstone bridge device for converting a sensed magnetic field into a first differential output voltage; a first amplifier for converting the first differential output voltage into a first amplified sensor signal; a second magnetoresistive wheatstone bridge device for converting the sensed magnetic field into a second differential output voltage; a second amplifier for converting the second differential output voltage into a second amplified sensor signal; a temperature sensor; and a hermetically sealed ceramic package enclosing the magnetoresistive wheatstone bridge devices, the amplifiers, and the temperature sensor.

In yet another aspect of the present invention, a torqueshaft magnetic field measurement system comprises a first magnetoresistive sensor for converting a first sensed magnetic field into a first differential output voltage; a first amplifier for converting the first differential output voltage into a first amplified sensor signal; a second magnetoresistive sensor for converting a sensed magnetic field into a second differential output voltage; a second amplifier for converting the second differential output voltage into a second amplified sensor signal; a temperature sensor; a ceramic package enclosing the magnetoresistive sensors, the amplifiers, and the temperature sensor; an electrical cable connected to the ceramic package; and an electronic controller connected to the electrical cable, the electronic controller including a microprocessor for receiving the amplified sensor signals and the temperature signal.

In another aspect of the present invention, a turbine engine comprises a torqueshaft having a circumferential magnetic region which changes magnetization in response to an applied torque; a torqueshaft magnetic field sensor disposed near the magnetic region for providing an amplified sensor signal in response to sensing a magnetic field at the magnetic region; an electrical cable connected to the torqueshaft magnetic field sensor; and an electronic controller connected to the electrical cable for receiving the amplified sensor signal.

In another aspect of the present invention, a method of sensing torque applied to a torqueshaft operating in a harsh environment comprises the steps of providing a magnetoresistive sensor operable in the harsh environment; providing on the torqueshaft a circumferential magnetic region which changes magnetization in response to an applied torque; and disposing the magnetoresistive sensor adjacent the circumferential magnetic region such that a change in the magnetization causes the magnetoresistive sensor to produce a sensor signal indicative of the applied torque.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides an apparatus and method for obtaining torque measurements on rotating shafts or similar members operating in harsh environments, such as in turbine engines.

The present invention provides a torqueshaft magnetic field measurement system which may utilize a magnetoresistive sensor to convert a magnetic field into a differential output voltage which may be amplified and transmitted to a microprocessor or to an electronic controller to provide reliable and consistent readings. In addition, the sensor temperature can be monitored to compensate for temperature effects on the magnetoresistive sensor and the torqueshaft magnetic field measurement system. In contrast, as a conventional magnetoresistive sensor may be restricted to operation over a limited temperature range, sensor temperature monitoring is typically not required.

Figure 1:
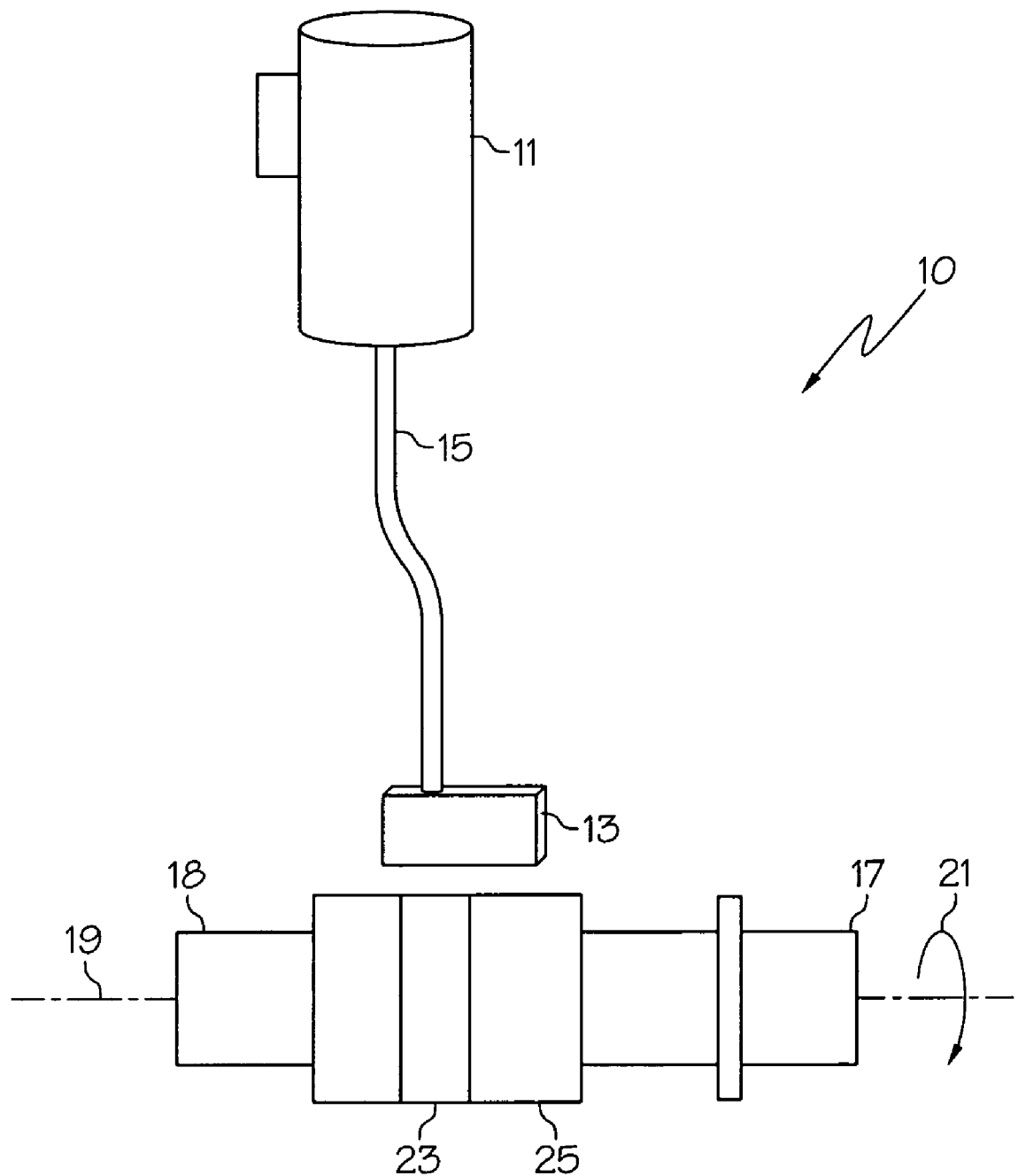
FIG. 1 is a diagrammatical illustration of a torqueshaft magnetic field measurement system including a controller, an electrical cable, and a torqueshaft magnetic field sensor in accordance with the present invention.

There is shown in FIG. 1 a torqueshaft magnetic field measurement system 10 which may include an electronic controller 11 and a torqueshaft magnetic field sensor 13 connected by an electrical cable 15. The electrical cable 15 may allow for emplacement of the torqueshaft magnetic field sensor 13 in a harsh temperature environment of, for example, −55° C. to 300° C., without subjecting the electronic controller 11 to the same harsh temperature environment. The torqueshaft magnetic field measurement system 10 may be used to provide an indication or signal related to the magnitude of an external torque 21 sustained by a torqueshaft 17 rotating about a shaft axis 19. The torqueshaft 17 may be disposed between a power source (not shown) and a load (not shown), whereby the torque 21 may be induced in the torqueshaft 17 by having the power source apply rotary power to the load via the torqueshaft 17.

Figure 4:
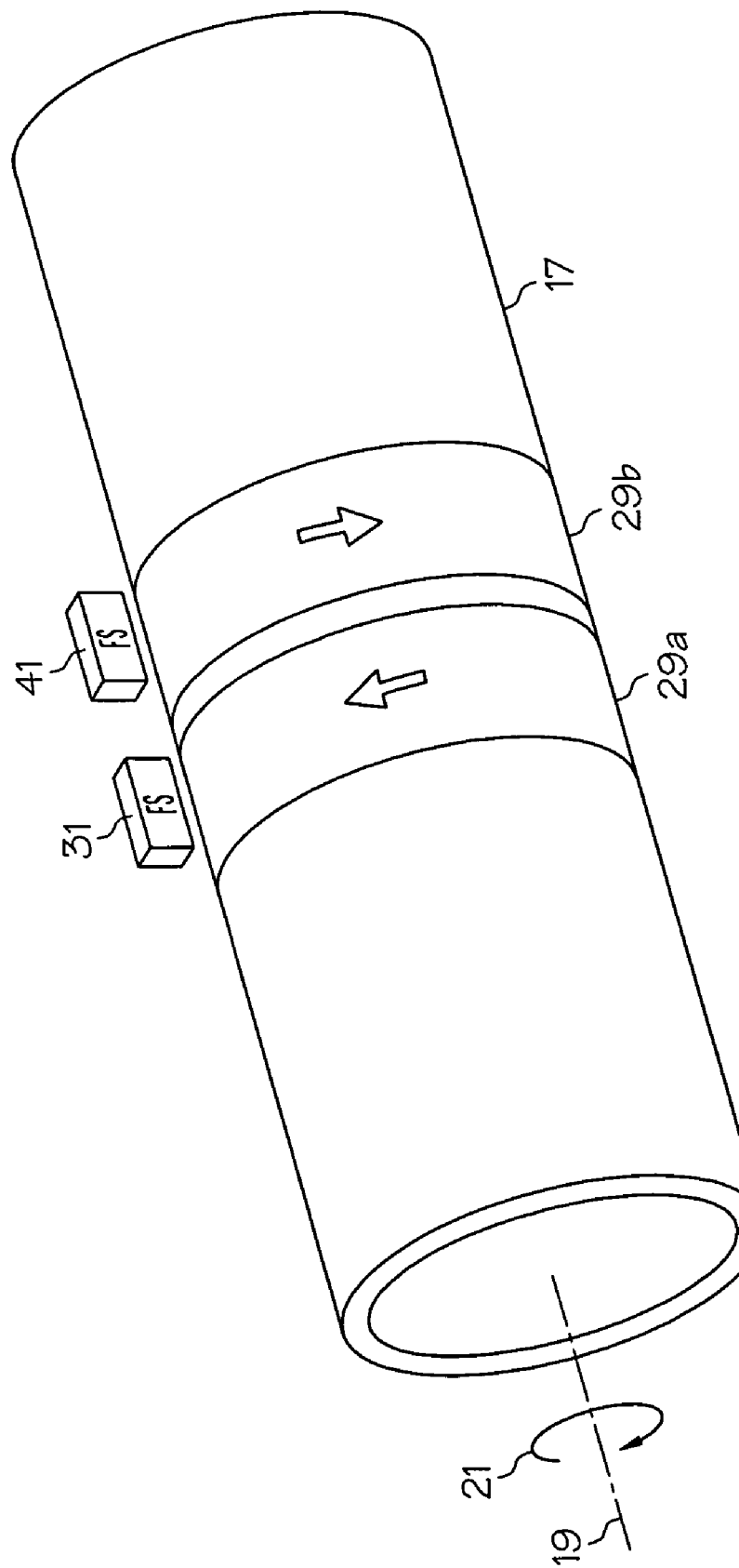
FIG. 4 is a diagrammatical illustration of a power shaft having two circumferential magnetic regions.

The torqueshaft 17 may include a ferromagnetic material comprising a circumferential torqueshaft magnetic region 23 having a circumferential magnetization, where the torqueshaft magnetic region 23 may comprise a ring or collar 25 pressed onto a surface 18 of the torqueshaft 17, or may comprise a magnetized integral portion of the torqueshaft 17 (see FIG. 4). In an exemplary embodiment, the ring 25 may have a thickness of approximately 0.1225 inch and may be press fitted onto the torqueshaft 17 having a diameter of approximately 2.47 inches. When the torqueshaft 17 is not subjected to the applied torque 21, magnetization remains circumferentially within the torqueshaft magnetic region 23.

Figure 2:
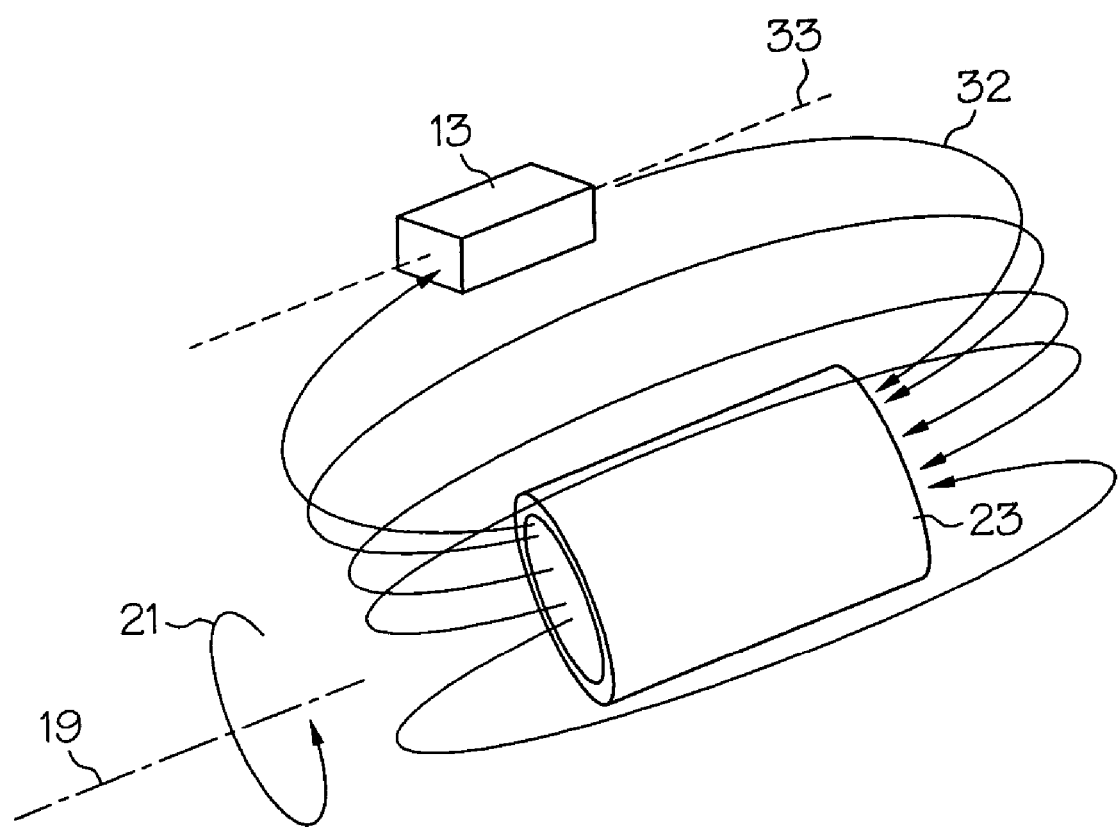
FIG. 2 is a diagram illustrating a magnetic field produced by applying torque to the shaft of FIG. 1 with a circumferential magnetic region.

However, when the torque 21 is applied causing elastic deformation of the torqueshaft 17, the magnetization of the torqueshaft magnetic region 23 may be altered in response and may produce a magnetic field 32 extending through the torqueshaft magnetic field sensor 13, as shown in FIG. 2. That is, the magnetic field 32 results from an increase in field strength, or flux density, in axial and radial directions at the torqueshaft 17 as a function of the torque 21 applied to the torqueshaft 17. As understood by one skilled in the relevant art, an axial direction may be parallel to the shaft axis 19 and a radial direction may be normal to the shaft axis 19.

Figure 3:
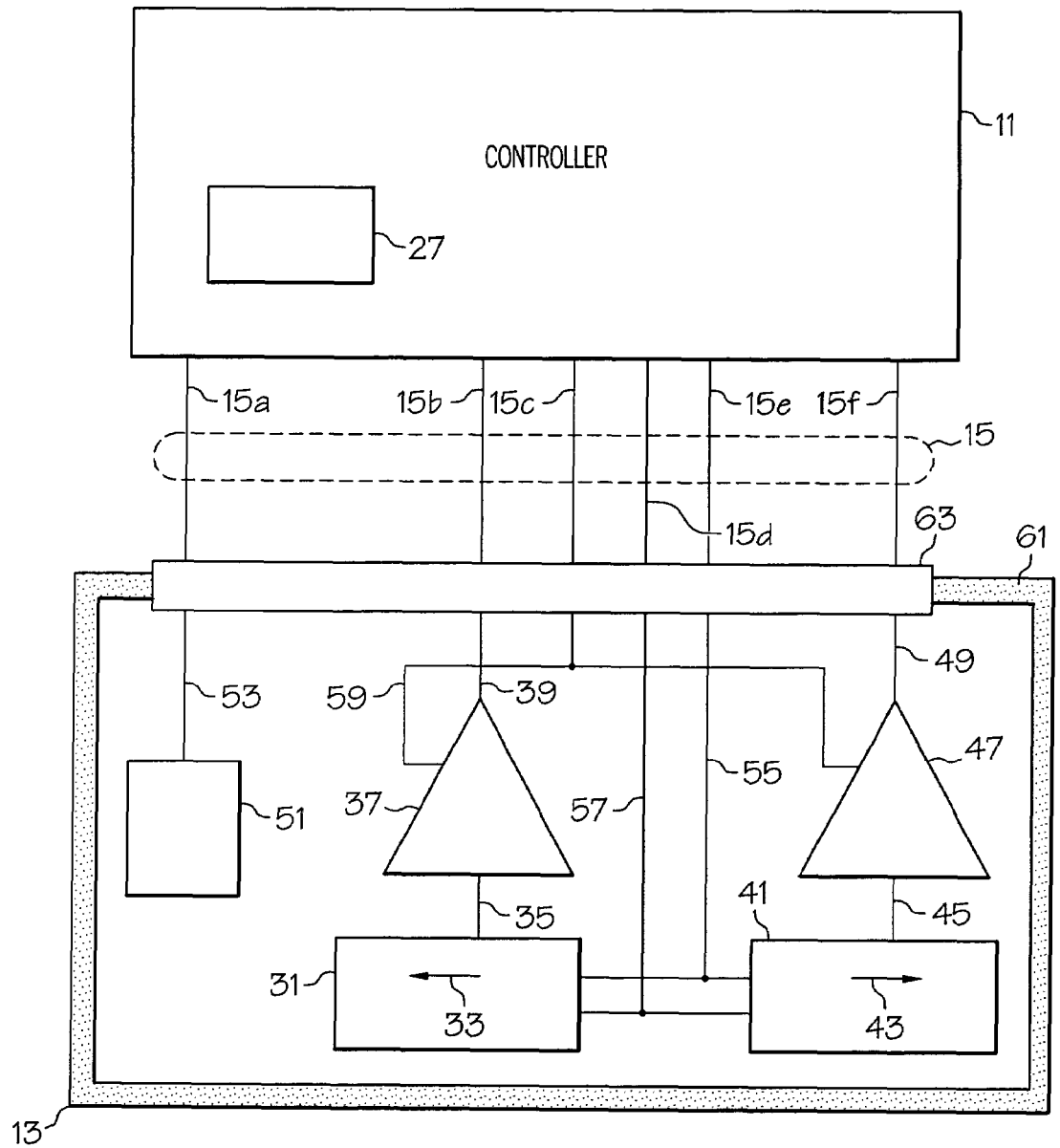
FIG. 3 is a functional block diagram of the torqueshaft magnetic field sensor of FIG. 1.

Referring also to FIG. 3, the torqueshaft magnetic sensor 13 may include a magnetoresistive sensor 31 having a field sensitivity axis 33 generally parallel to the shaft axis 19 and, hence, to the direction of the flux lines in the magnetic field 32. The magnetoresistive sensor 31 may be a four-element magnetoresistive wheatstone bridge device functioning to convert a sensed magnetic field into a differential output voltage and may be, for example, an HMC1021D magnetic sensor specified for operation at temperature range over −55° C. to 300° C., manufactured by Honeywell Solid State Electronics, Plymouth, Minn.

When the magnetic field 32 is sensed by the magnetoresistive sensor 31, an output signal 35 may be provided to an amplifier 37. The amplifier 37 may transmit a corresponding amplified sensor signal 39 to a microprocessor 27 in the electronic controller 11 via an amplified sensor signal line 15b. In an exemplary embodiment of the present invention, the output signal 35 may be amplified to provide for transmission of the output signal 35 to the electronic controller 11 over the electrical cable 15. In one embodiment of the present invention, the sensed magnetic field may have a range of approximately ±6 gauss. The corresponding output signal 35 may comprise a five millivolt reading per gauss of magnetic field, and the amplified sensor signal 39, corresponding to the ±6 gauss magnetic field, may comprise a 0.5 to 4.5 volt signal produced by the amplifier 37 with suitable gain resistors (not shown). In an exemplary embodiment, the amplified sensor signal 39 may represent a torque value of up to 2200 ft-lb.

Figure 5:
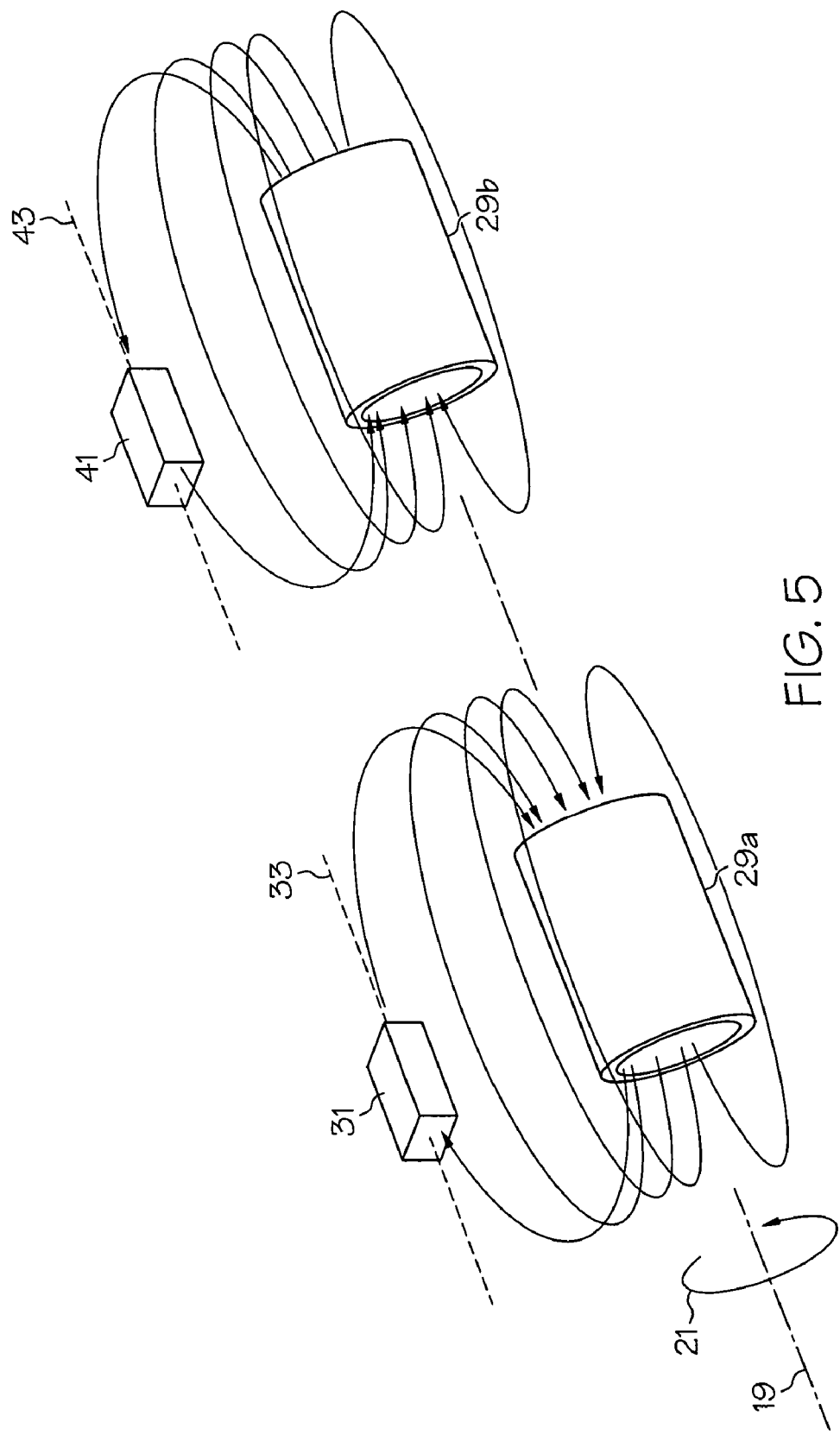
FIG. 5 is a diagram illustrating opposed magnetic fields produced by applying torque to the shaft of FIG. 4.

In an alternative embodiment, the torqueshaft magnetic field sensor 13 may include a second magnetoresistive sensor 41 having a second field sensitivity axis 43 generally parallel to the shaft axis 19 and in a direction opposite to that of the field sensitivity axis 33. When the magnetic field 32 is detected by the second magnetoresistive sensor 41, a second output signal 45 may be provided to a second amplifier 47. The second amplifier 47 may transmit a second amplified sensor signal 49 to the microprocessor 27 in the electronic controller 11 via a second amplified sensor signal line 15f. By using two magnetoresistive sensors 31 and 41 having respective field sensitivity axes 33 and 43 oriented in opposed directions, as shown in FIG. 5, the effects of stray magnetic fields, such as the earth's magnetic field, can be canceled out, as can be appreciated by one skilled in the relevant art.

The torqueshaft magnetic field measurement system 10 may include a set/reset signal line 15e. In an exemplary embodiment, a set/reset signal 55 comprising a current pulse of up to four amperes may be sent along the set/reset line 15e to "set" the magnetoresistive sensors 31 and 41 for maximum sensitivity. The torqueshaft magnetic field measurement system 10 may also include an offset signal line 15d. In an exemplary embodiment, an offset signal 57 comprising a current of approximately fifteen milliamperes may be sent along the offset signal line 15d to bias the magnetoresistive sensors 31 and 41 such that the sensing range of the magnetoresistive sensors 31 and 41 is biased to read from approximately −3 gauss to approximately +9 gauss. Power may be provided to the amplifiers 37 and 47 via a power supply line 15c. In an exemplary embodiment, the electronic controller 11 may provide a power supply 59 of five volts at up to 20 mA to the amplifiers 37 and 47.

The magnetoresistive sensors 31 and 41, the amplifiers 37 and 47, and the gain resistors may be specified for operation over an extended temperature range to allow for operation in harsh environments, such as for torque measurement inside turbine engines or for monitoring industrial processes. The amplifiers 37 and 47 may, for example, comprise high temperature Quad Amplifiers HT1104 specified for operation over −55° C. to 225° C., manufactured by Honeywell Solid State Electronics, Plymouth, Minn.

In an alternative embodiment, a temperature sensor 51, such as a thermister, may provide a temperature signal 53 via a temperature signal line 15a to the microprocessor 27 for use in calibrating the received amplified signals 39 and 49. For example, the sensitivity of the magnetoresistive sensors 31 and 41 may range from approximately 0.34 volts/oersted at −40° C. to approximately 0.27 volts/oersted at 150° C. The microprocessor 27 may function to modify the amplified sensor signals 39 and 49 by compensating for variations in magnetoresistive sensors 31 and 41 sensitivity, respectively. The magnetoresistive sensors 31 and 41, the amplifiers 37 and 47, the gain resistors, and the temperature sensor 51 may be enclosed in a high-temperature housing such as a ceramic package 61 with a hermetic seal 63 securing the electrical cable 15 lead-in.

As shown in FIG. 4, the torqueshaft 17 may have a first torqueshaft magnetic region 29a and a second torqueshaft magnetic region 29b, where the magnetization in the first torqueshaft magnetic region 29a is in a direction opposite to the direction of magnetization in the second torqueshaft magnetic region 29b. The torque 21 may be measured by obtaining the amplified sensor signals 39 and 49 from the respective magnetoresistive sensors 31 and 41.

Preferably, the magnetoresistive sensors 31 and 41 are located so as to provide optimal amplified sensor signals 39 and 49. The magnetoresistive sensor 31, for example, may be positioned axially, in the direction of the shaft axis 19, so as to obtain the greatest sensitivity to the magnetic field produced by the first torqueshaft magnetic region 29a, and may be spaced radially from the shaft axis 19 so as to be positioned in a sensed magnetic field having a range lying within the detection limits of the magnetoresistive sensor 31.

The magnetoresistive sensor 41 may be similarly positioned with respect to the second torqueshaft magnetic region 29b to provide an optimal spacing between the magnetoresistive sensors 31 and 41. As can be appreciated by one skilled in the relevant art, optimal spacing and pitch of the magnetoresistive sensors 31 and 41 is related to and is preferably determined from the physical attributes of the magnetic fields produced by the torqueshaft magnetic regions 29a and 29b. In an exemplary embodiment, the magnetoresistive sensor 31 may be spaced approximately 0.150 to 0.160 inches from the surface of first torqueshaft magnetic region 29a, and the magnetoresistive sensors 31 and 41 may be spaced at a pitch of approximately 0.600 to 0.700 inches.

Figure 6:
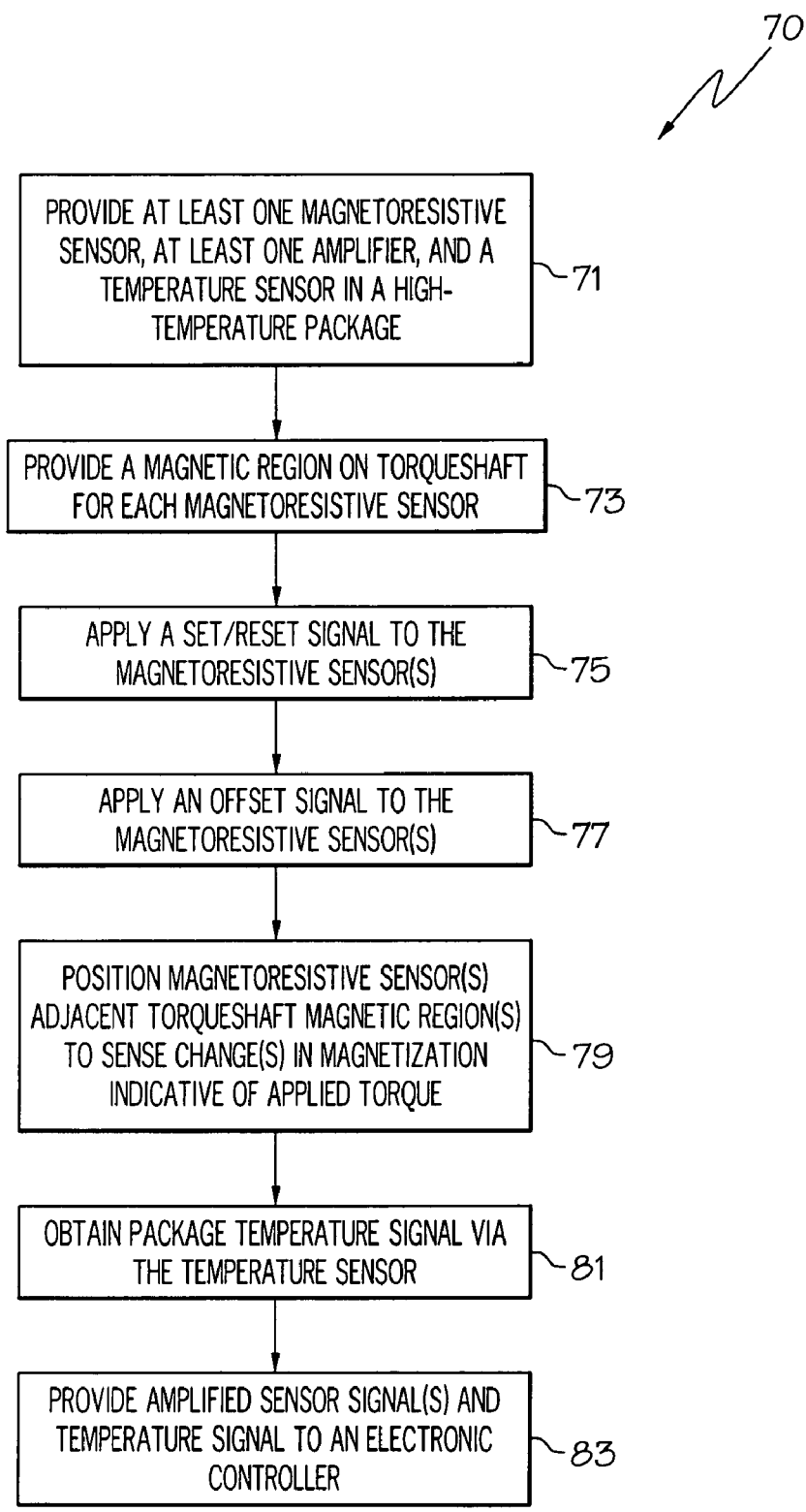
FIG. 6 is a flow diagram describing a process for sensing torque applied to a shaft operating in a harsh environment.

A process for sensing torque applied to a shaft operating in a harsh environment may be described with reference to a flow diagram 70 shown in FIG. 6. At least one magnetoresistive sensor, such as the magnetoresistive sensor 31, at least one amplifier, such as the amplifier 37, and a temperature sensor, such as the temperature sensor 51, may be housed in a high-temperature package, such as the ceramic package 61, to form a torqueshaft magnetic field sensor, such as the torqueshaft magnetic sensor 13, at step 71. A magnetic region, such as the magnetic region 29a, may be provided on a torque-bearing shaft, such as the torqueshaft 17, at step 73. The set/reset signal 55 may be applied to the magnetoresistive sensor, at optional step 75. The offset signal 57 may be applied to the magnetoresistive sensor, at optional step 77.

The magnetoresistive sensor may be placed adjacent the magnetoelastic region to sense change in magnetization indicative of torque applies to the torque-bearing shaft, at step 79. The package temperature signal 53 may be obtained from the magnetoelastic sensor, at optional step 81. An amplified sensor signal, such as the amplified sensor signal 39, may be provided to an electronic controller, such as the electronic controller 11, at step 83.

It should be understood, of course, that the foregoing relates to exemplary embodiments of the invention and that modifications may be made without departing from the spirit and scope of the invention as set forth in the following claims.

We claim:

1. A torqueshaft magnetic field measurement system comprising:
   a torqueshaft magnetic field sensor, including a first magnetoresistive sensor and a second magnetoresistive sensor, for converting a sensed magnetic field into a first amplified sensor signal and a second amplified signal, respectively, said second magnetoresistive sensor having a field sensitivity axis oriented in a direction opposite to a second field sensitivity axis in said first magnetoresistive sensor;
   an electrical cable connected to said torqueshaft magnetic field sensor;
   an electronic controller connected to said electrical cable for receiving said first and second amplified sensor signals,
   wherein said first magnetoresistive sensor is disposed at a pitch of approximately 0.600 to 0.700 inches from said second magnetoresistive sensor.

2. The torqueshaft magnetic field measurement system of claim 1 further comprising a thermistor producing an electrical signal related to the temperature of said torqueshaft magnetic field sensor.

3. The torqueshaft magnetic field measurement system of claim 2 wherein said electronic controller comprises a microprocessor for receiving a temperature signal from said thermistor.

4. The torqueshaft magnetic field measurement system of claim 1 wherein said electronic controller comprises a microprocessor for adjusting said first and second amplified sensor signals to compensate for sensitivity variation in said torqueshaft magnetic field sensor.

5. A torqueshaft magnetic field sensor comprising:
   a first magnetoresistive wheatstone bridge device for converting a sensed magnetic field into a first differential output voltage;
   a first amplifier for converting said first differential output voltage into a first amplified sensor signal;
   a second magnetoresistive wheatstone bridge device for converting said sensed magnetic field into a second differential output voltage, said second magnetoresistive wheatstone bridge having a sensitivity axis oriented in a direction opposed to a sensitivity axis of said first magnetoresistive wheatstone bridge;
   a second amplifier for converting said second differential output voltage into a second amplified sensor signal;
   a temperature sensor; and
   a hermetically sealed ceramic package enclosing said first and second magnetoresistive wheatstone bridge devices, said first and second amplifiers, and said temperature sensor.

6. The torqueshaft magnetic field sensor of claim 5 wherein said first and second magnetoresistive wheatstone bridge devices, said first and second amplifiers, and said temperature sensor have an operating temperature range of from −55° C. to 225° C.

7. The torqueshaft magnetic field sensor of claim 5 further comprising an electrical cable connected to said ceramic package, said electrical cable including at least one of a temperature signal line, a first amplified sensor signal line, a second amplified sensor signal line, a set/reset signal line, an offset signal line, and a power supply line.

8. A torqueshaft magnetic field measurement system comprising:

a first magnetoresistive sensor for converting a sensed magnetic field into a first differential output voltage;

a first amplifier for converting said first differential output voltage into a first amplified sensor signal;

a second magnetoresistive sensor for converting a sensed magnetic field into a second differential output voltage, said second magnetoresistive wheatstone bridge having a sensitivity axis oriented in a direction opposed to a sensitivity axis of said first magnetoresistive wheatstone bridge;

a second amplifier for converting said second differential output voltage into a second amplified sensor signal;

a temperature sensor;

a ceramic package enclosing said first and second magnetoresistive sensors, said first and second amplifiers, and said temperature sensor;

an electrical cable connected to said ceramic package; and an electronic controller connected to said electrical cable, said electronic controller including a microprocessor for (i) receiving said first and second amplified sensor signals and said temperature signal and (ii) supplying offset signals to the first and second magnetoresistive sensors.

9. The torqueshaft magnetic field measurement system of claim 8 wherein said electronic cable includes at least one of a temperature sense line, a set/reset line, and an offset line.

10. A method for sensing torque applied to a torqueshaft operating in a harsh environment, said method comprising the steps of:

providing a first magnetoresistive sensor operable in the harsh environment;

providing a second magnetoresistive sensor having a sensitivity axis oriented in a direction opposed to a sensitivity axis of said first magnetoresistive sensor;

providing on the torqueshaft a circumferential magnetic region which changes magnetization in response to an applied torque;

disposing said first and second magnetoresistive sensors adjacent said circumferential magnetic region such that the sensitivity axis of said first magnetoresistive sensor and the sensitivity axis of the second magnetoresistive sensor are both parallel to the torqueshaft and such that a change in said magnetization causes said first and second magnetoresistive sensors to produce first and second sensor signals, respectively, indicative of the applied torque; and applying an offset signal to said first and second magnetoresistive sensors.

11. The method of claim 10 wherein said step of disposing said first and second magnetoresistive sensor adjacent said circumferential magnetic region comprises the step of sensing a change in magnetization in response to a torque applied to the torqueshaft and producing said first and second sensor signals.

12. The method of claim 10 further comprising the step of amplifying said first and second sensor signals for transmission to an electronic controller.

13. The method of claim 10 further comprising the step of providing a temperature sensor adjacent said first and second magnetoresistive sensors.

14. The method of claim 10 further comprising the step of enclosing said first and second magnetoresistive sensors in a ceramic package.

15. A torqueshaft magnetic field measurement system comprising:

a torqueshaft magnetic field sensor, including a first magnetoresistive sensor and a second magnetoresistive sensor, for converting a sensed magnetic field into a first amplified sensor signal and a second amplified signal, respectively, said second magnetoresistive sensor having a field sensitivity axis oriented in a direction opposite to a second field sensitivity axis in said first magnetoresistive sensor;

an electrical cable connected to said torqueshaft magnetic field sensor; and an electronic controller connected to said electrical cable for receiving said first and second amplified sensor signals, wherein said electrical cable includes offset signal lines for transmitting offset signals to said torqueshaft magnetic field sensor.

16. A torqueshaft magnetic field measurement system comprising:

a torqueshaft magnetic field sensor, including a first magnetoresistive sensor and a second magnetoresistive sensor, for converting a sensed magnetic field into a first amplified sensor signal and a second amplified signal, respectively, said second magnetoresistive sensor having a field sensitivity axis oriented in a direction opposite to a second field sensitivity axis in said first magnetoresistive sensor;

an electrical cable connected to said torqueshaft magnetic field sensor; and an electronic controller connected to said electrical cable for receiving said first and second amplified sensor signals, wherein said electrical cable includes set/reset signal lines for transmitting set/reset signals to said torqueshaft magnetic field sensor.

* * * * *